Feb. 22, 1927. 1,618,961
A. H. FAGER
COMPENSATING TRUCK WHEEL ATTACHMENT
Filed Dec. 14, 1925
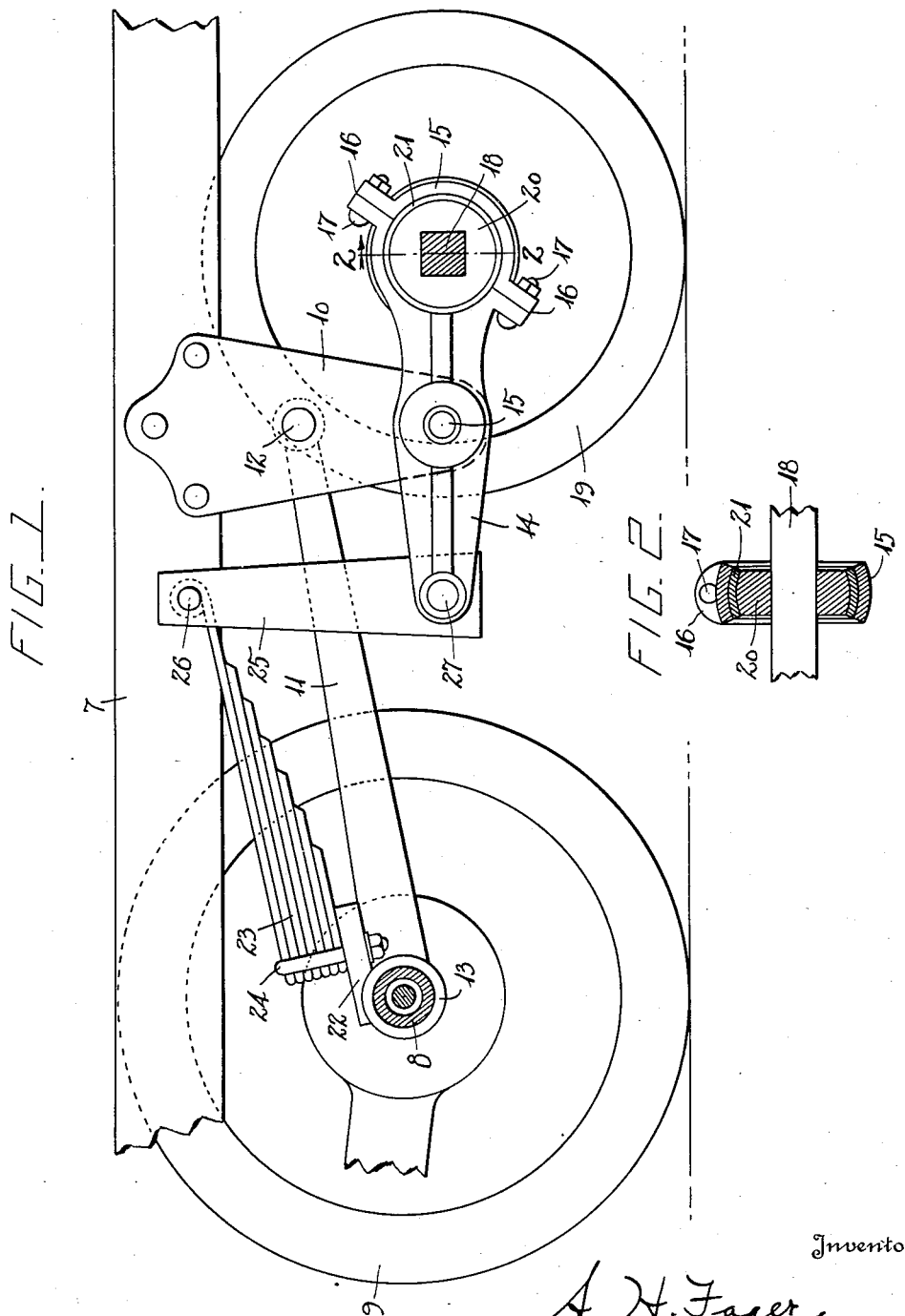
Inventor:
A. H. Fager
By Monroe E. Miller
Attorney.

Patented Feb. 22, 1927.

1,618,961

UNITED STATES PATENT OFFICE.

ALBERT H. FAGER, OF LOS ANGELES, CALIFORNIA, ASSIGNOR OF ONE-HALF TO H. A. FAGER, OF LOS ANGELES, CALIFORNIA.

COMPENSATING TRUCK WHEEL ATTACHMENT.

Application filed December 14, 1925. Serial No. 75,394.

The present invention relates to a compensating wheel attachment for a motor truck, and one object of the invention is to provide novel means for attaching a pair of extra wheels to a motor truck.

Another object is to provide a novel compensating connection of the extra or additional wheels with the frame and the wheel axle (preferably the rear axle) of the chassis, to provide for a compensating action due to changes of wheel loads when passing over irregularities in the surface of a road.

A further object is to provide a yieldable connection between two pairs of wheels and the frame, enabling either pair of wheels to move upwardly and downwardly relatively to the frame, but distributing the stresses and strains between the two pairs of wheels.

A still further object is the provision of means for connecting an extra pair of wheels to the frame and wheel axle of a motor truck chassis, to permit either pair of connected wheels to move upwardly and downwardly relatively to the frame, but transmitting the greater part of the load to the regular wheels of the chassis.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a side elevation of the improved structure, the rear wheels being removed and the axles shown in section.

Fig. 2 is a section on the line 2—2 of Fig. 1.

Only a portion of a motor truck chassis is shown in the drawing, including the frame 7 and rear axle housing 8, the attachment being applied to the rear axle of the truck as shown, and the rear axle has a wheel 9 at each end, as usual. The customary springs may or may not be used between the rear axle housing 8 and frame 7.

In applying the attachment to the chassis, a depending bracket or rigid hanger 10 is suitably secured to the frame 7 at each side thereof in rear of the axle housing 8, and a radius bar 11 is pivoted, at its rear end, as at 12, to each bracket 10 and has a ring or band 13 at its forward end loosely embracing the axle housing 8, whereby the bar 11 swings toward and away from the frame 7 as the frame 7 and axle housing 8 move toward and away from one another.

A substantially horizontal lever or rocker member 14 is pivoted between its ends, as at 15, to the lower end portion of each bracket 10, below the pivot 12, and the rear arm of the lever 14 has a band or ring 15, which is split, as at 16, with the outstanding ears at the adjacent ends of the sections secured together by means of bolts 17 or otherwise.

The attachment includes an extra axle 18, and a wheel 19 at each end, and the extra pair of wheels are located in rear of the regular rear wheels 9. The axle 18 passes slidably through a circular member or disk 20 disposed within one band 15, to permit of sliding motion of the axle in said member 20, and the axle extends through and is rigidly secured to the other member 20 thereby preventing displacement of the axle 18 transversely of the frame. The periphery of the member 20 is of spherical form, and a liner 21 of similar form is fitted within the band 15 and embraces the member 20. The member 20 can therefore oscillate within the band 15 when the axle 18 is rocked transversely of the truck, due to the wheels 19 at the opposite sides passing over irregularities in the surface of the road. The liner 21 is of brass or other suitable bearing material. The connection of the axle 18 with each lever 14, through the member 20, is thus a ball and socket or universal joint connection, permitting of freedom or flexibility of motion, in addition to the sliding of the axle 18 in one member 20.

The axle housing 8 and axle 18 are connected for the transmission of strains and stresses from one to the other. Thus, each radius bar 11 is provided at its forward end with a seat or abutment 22 on which is secured the butt end of a rearwardly extending laminated leaf spring 23. As shown, a U-bolt or clamp 24 embraces the spring 23 and engages through the seat 22 for securing the spring to said seat. The spring 23 is located above the radius bar 11, and the rear free end of the spring 23 is connected to the forward arm of the lever 14 by means of a link 25 which crosses the bar 11. The link 25 is pivoted as at 26 and 27, respectively, to the spring 23 and lever 14.

When a stress or strain occurs, tending to move the axle 8 and frame 7 toward one another, each bar 11 is swung toward the frame 7, and this will move the butt end of the spring 23 toward the frame 7, thereby flexing or bending the spring, and exerting an upward pull on the link or shackle 25. Consequently, the forward arm of the lever 14 is given an upward swinging stress, tending to depress the rear arm of the lever 14 and the axle 18. When there is a stress or strain tending to move the axle 18 and frame 7 toward one another, the rear arm of each lever 14 is swung toward the frame 7, thereby swinging the forward arm of the lever away from the frame and pulling the link or shackle 25 away from the frame 7 and bending or flexing the rear terminal of the spring 23 downwardly, thereby tending to depress the bar 11 and axle 8. In this way, the stresses and strains are distributed between the two axles and pairs of wheels, but the greater load is transmitted to the rear axle 8.

Having thus described the invention, what is claimed as new is:—

1. The combination with the frame and a wheel axle of a motor truck chassis, of an extra wheel axle, a lever connected to the secondnamed axle, a radius bar connected to the firstnamed axle, means for connecting said lever and bar with the frame, and a spring connection between said bar and lever.

2. The combination with the frame and a wheel axle of a motor truck chassis, of an extra wheel axle, a lever having opposite arms, one arm of the lever being connected to the secondnamed axle, a radius bar connected to the firstnamed axle, means connecting said lever and bar with the frame, and a spring connection between said bar and the other arm of the lever.

3. The combination with the frame and a wheel axle of a motor truck chassis, of an extra wheel axle, a lever having opposite arms, one arm of the lever being connected to the secondnamed axle, a radius bar connected to the firstnamed axle, means connecting said lever and bar with the frame, a spring mounted on said bar, and a link connecting said spring and the other arm of the lever.

4. The combination with the frame and a wheel axle of a motor truck chassis, of an extra wheel axle, a lever having opposite arms, one arm of the lever being connected to the secondnamed axle, a radius bar connected to the firstnamed axle, means connecting said lever and bar with the frame, a leaf spring mounted on said bar, and a link connecting said spring and other arm of the lever.

5. The combination with the frame and a wheel axle of a motor truck chassis, of an extra wheel axle, a depending bracket secured to said frame, a lever pivoted to said bracket and having opposite arms with one arm connected to the secondnamed axle, a radius bar connected to the firstnamed axle and pivoted to said bracket, and a yieldable connection between said bar and the other arm of said lever.

6. The combination with the frame and a wheel axle of a motor truck chassis, of an extra wheel axle, a depending bracket secured to said frame, a lever pivoted to the bracket and connected to the secondnamed axle, a radius bar pivoted to said bracket and connected to the firstnamed axle, and a yieldable connection between said bar and lever.

7. The combination with the frame and a wheel axle of a motor truck chassis, of an extra wheel axle, a depending bracket secured to said frame, a lever pivoted to said bracket and having opposite arms, one arm being connected to the secondnamed axle, a radius bar pivoted to said bracket and connected to the other axle, a spring mounted on said bar, and a link connecting said spring and other arm of the lever.

8. The combination with the frame and a wheel axle of a motor truck chassis, of an extra wheel axle, a depending bracket secured to said frame, a lever pivoted to said bracket and having opposite arms, one arm being connected to the secondnamed axle, a radius bar pivoted to said bracket and connected to the other axle, a leaf spring secured on said bar and extending toward said bracket, and a link connecting said spring and the other arm of said lever.

9. The combination with the frame and a wheel axle of a motor truck chassis, of an extra wheel axle, a depending bracket secured to said frame, a lever pivoted to said bracket, a radius bar pivoted at one end to said bracket and connected at its opposite end to the firstnamed axle, the lever having one arm below said bar and having an opposite arm connected to the secondnamed axle, a leaf spring secured on said bar near the secondnamed end thereof and projecting toward said bracket, and a link connecting said spring and firstnamed arm of the lever and crossing said bar.

In testimony whereof I hereunto affix my signature.

ALBERT H. FAGER.